Figure 3:
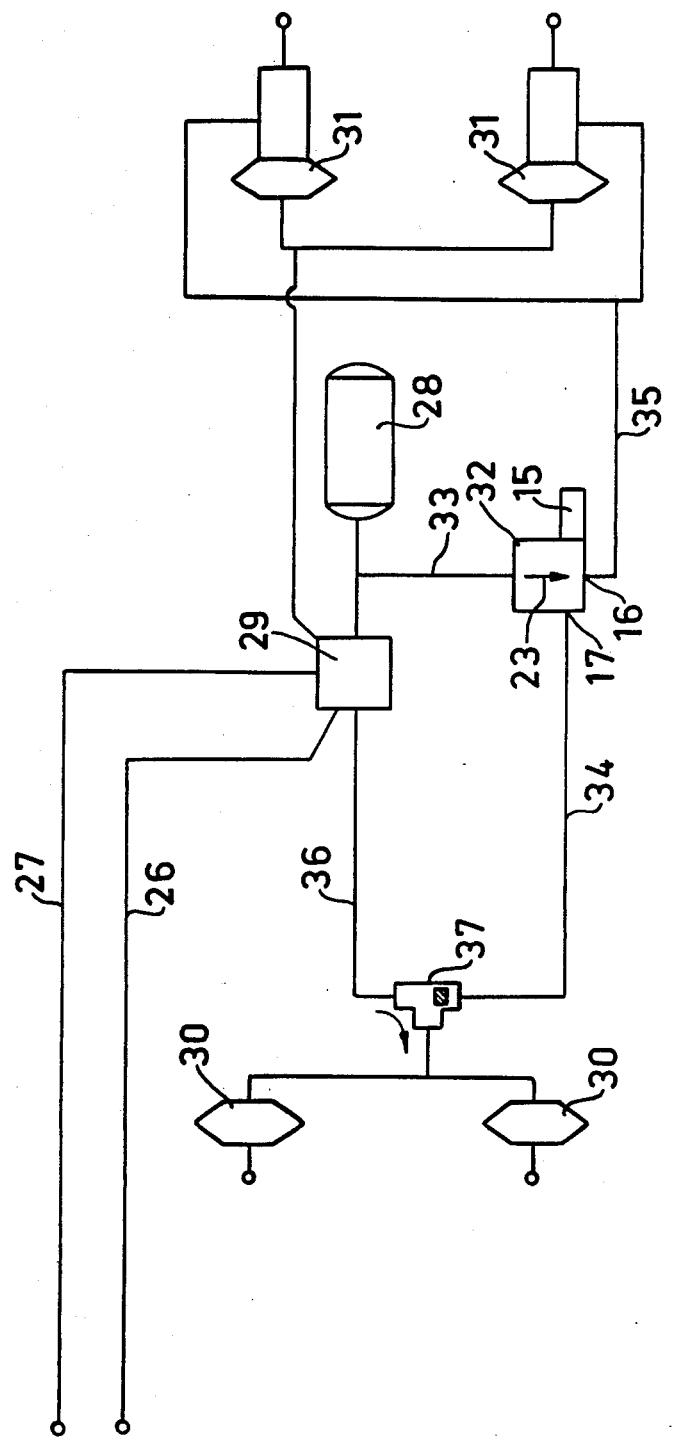

United States Patent [19]

Gustafsson

[11] Patent Number: 4,621,874
[45] Date of Patent: Nov. 11, 1986

[54] VEHICLE THEFT-PREVENTING DEVICE ACTING ON THE BRAKE SYSTEM

[76] Inventor: Jan Gustafsson, Öregrundsgatan 7, Stockholm, Sweden, S-115 41

[21] Appl. No.: 667,498
[22] PCT Filed: Feb. 14, 1984
[86] PCT No.: PCT/SE84/00054
 § 371 Date: Oct. 16, 1984
 § 102(e) Date: Oct. 16, 1984
[87] PCT Pub. No.: WO84/03263
 PCT Pub. Date: Aug. 30, 1984

[30] Foreign Application Priority Data

Feb. 18, 1983 [SE] Sweden .................. 8300922

[51] Int. Cl.⁴ .................................. B60T 17/00
[52] U.S. Cl. .............................. 303/89; 180/287
[58] Field of Search .................. 188/265; 303/9, 71, 303/85, 89; 180/287

[56] References Cited

U.S. PATENT DOCUMENTS

| 3,879,091 | 4/1975 | Bridwell et al. | 303/71 |
| 3,973,805 | 8/1976 | Stevenson et al. | 303/71 X |
| 4,258,819 | 3/1981 | Baptiste | 303/89 X |
| 4,300,057 | 11/1981 | Batle Crosas | 303/89 X |
| 4,519,653 | 5/1985 | Smith | 303/89 |

FOREIGN PATENT DOCUMENTS

| 2246045 | 3/1973 | Fed. Rep. of Germany . |
| 2845011 | 4/1979 | Fed. Rep. of Germany . |
| 2755178 | 6/1979 | Fed. Rep. of Germany . |
| 2903272 | 1/1980 | Fed. Rep. of Germany . |

Primary Examiner—Duane A. Reger
Attorney, Agent, or Firm—Holman & Stern

[57] ABSTRACT

Devices for preventing the theft of vehicles and trailers are known, of which vehicles and trailers the decelerating brakes and parking brake consist of brakes operated with compressed air. The device comprises a valve controlled by a code lock. In order to double the safety against manipulation of the locking device, the valve consists of a three-way valve (14) with one inlet port and two outlet ports (16,17), which valve (14) is inserted in the feed line (11) between a pressure medium source (4) for actuating the parking brake and the control valve (12) for the parking brake, with the inlet port connected to the pressure medium source (4). One outlet port (16) is connected to the control valve (12), and the second outlet port (17) is connected to the decelerating brake circuit for either wheel pair (1) via a first check valve (19). The feed line (9) from the foot-operated decelerating brake valve (6) comprises a second check valve (21), and the valve body (23) of the three-way valve (14) by the locked position of the code lock (15) is held in the position, which closes the connection between the inlet port and said firstmentioned outlet port (16), but holds the connection open between the inlet port and said second outlet port (17), and vice versa in open position of the code lock, and the line (18) between the three-way valve (14) and the first check valve (19) is relieved of pressure when the code lock assumes open position.

5 Claims, 5 Drawing Figures

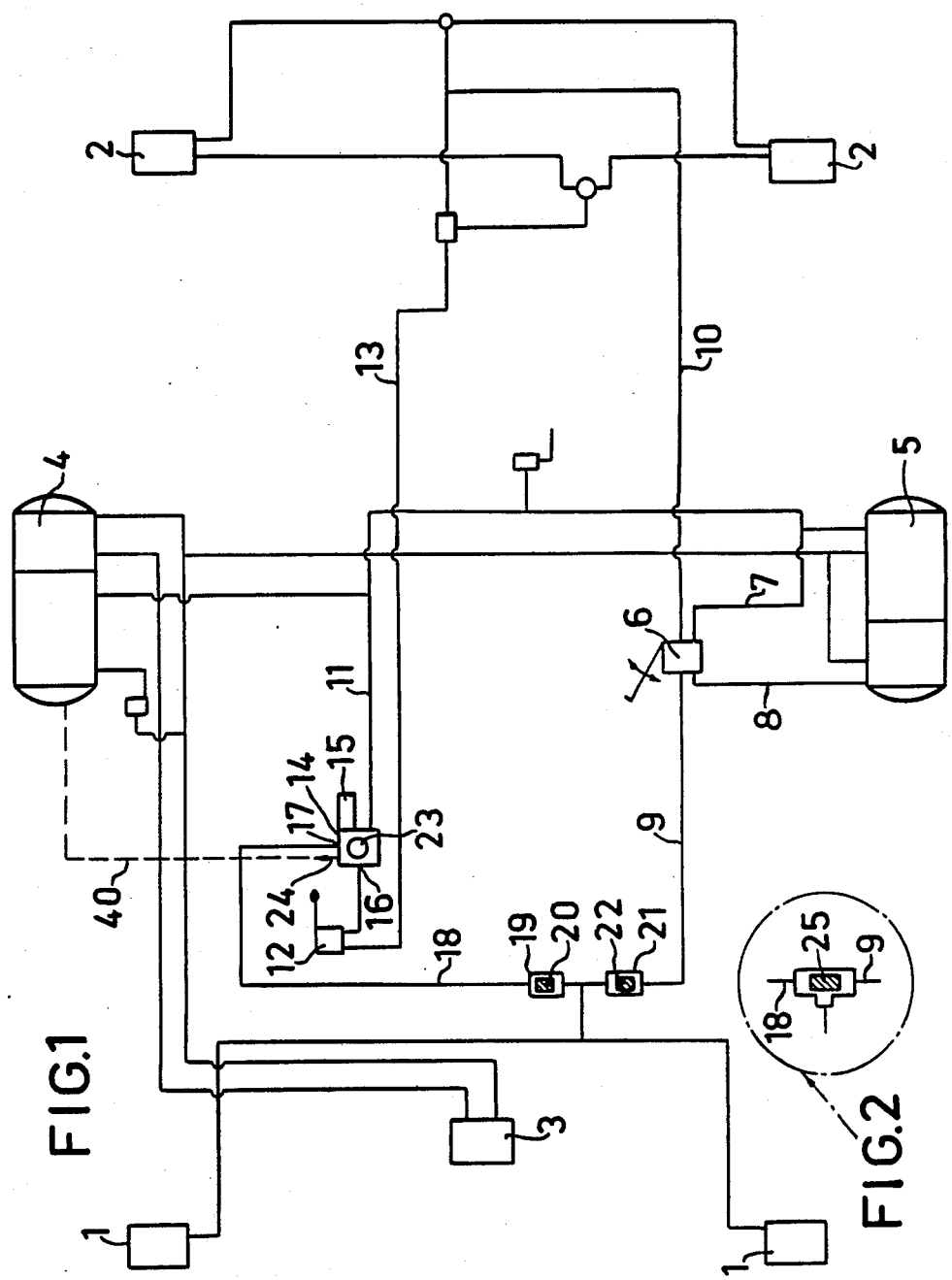

VEHICLE THEFT-PREVENTING DEVICE ACTING ON THE BRAKE SYSTEM

CROSS REFERENCE TO RELATED APPLICATION(S)

This United States application stems from PCT International Application No. PCT/SE84/00054 filed Feb. 14, 1984.

Theft-preventing devices acting on brake systems are known previously. As examples can be mentioned devices disclosed in OS Nos. 22 46 045, 27 55 178, 28 45 011 and 29 03 272.

The present invention has the object to improve known anti-theft devices of the kind referred to above, so that the safety against opening the locking device by force is twice as high.

The characterizing features of the invention are defined in the attached claims.

A further object of the invention, in addition to the aforesaid advantage, is to render it possible to safely utilize a code lock in such a manner, that persons having knowledge of the code can feed in the correct code and thereby release the brakes so that the vehicle can be moved.

Figure 4:
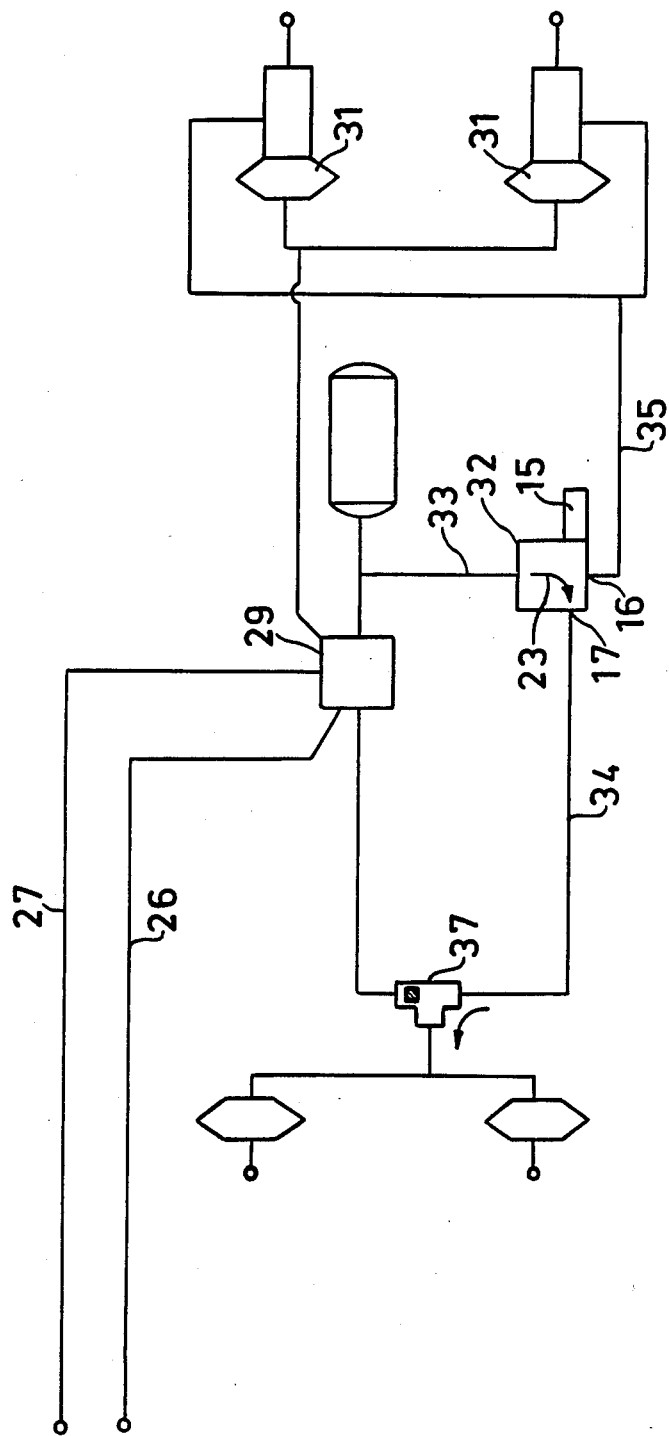
Figure 5:
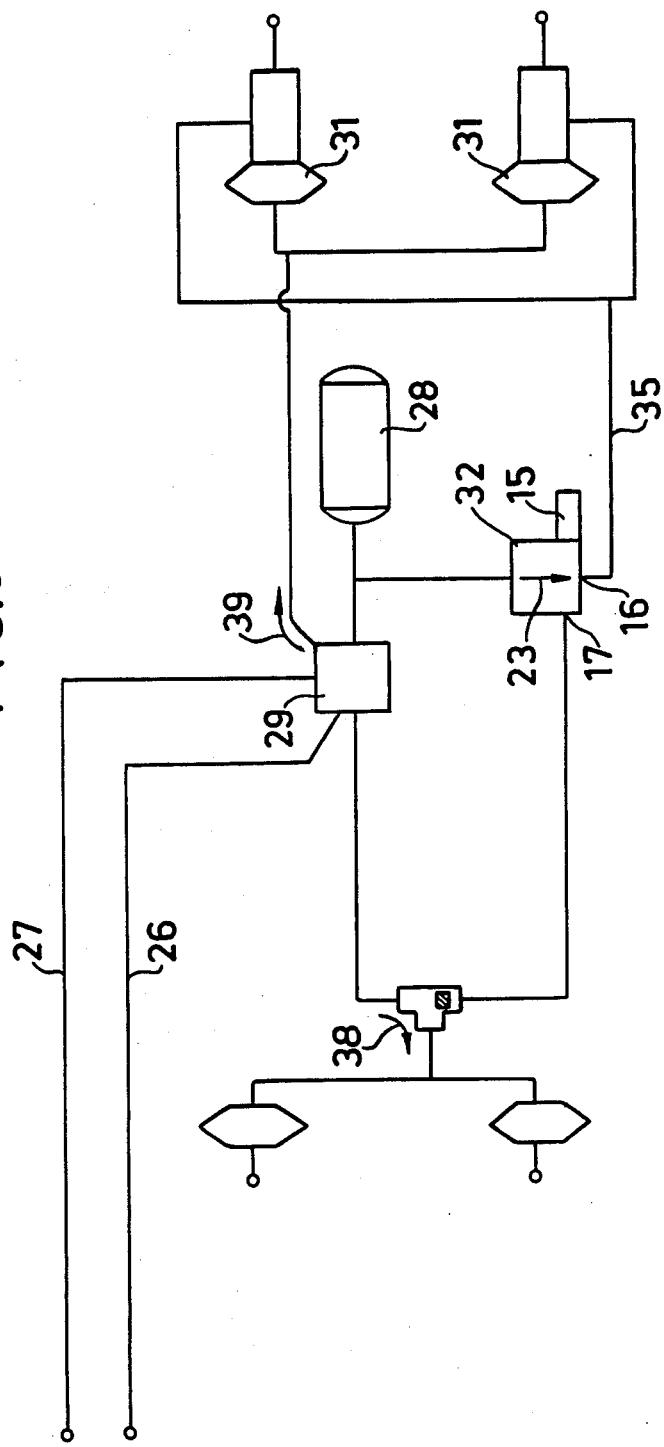

The invention is described in the following, with reference to the accompanying drawings, in which FIG. 1 shows schematically an embodiment of the invention in one application, FIG. 2 shows a second embodiment of a detail comprised in the invention, FIGS. 3–5 show schematically the invention in a second application and in three different functional phases.

In FIG. 1 a compressed-air operated brake system for a traction vehicle, for example a lorry, is shown schematically. The front wheels of the vehicle are designated by 1, and the rear wheels by 2. These wheels comprise conventional brakes operated by compressed air. The compressed air system consists of a compressor 3, which delivers compressed air to two compressed-air tanks 4 and 5. The tanks can be divided into two parts. The decelerating brake comprises a foot-operated valve 6, which receives compressed air from the tanks 4 and 5. The feed line is designated by 7. A second feed line is designated by 8. Through a line 9 extending from the valve 6 compressed air is transported all the way to the brakes of the front wheels 1. A similar line 10 extends to the brakes of the rear wheels 2. The decelerating brake system is of conventional design and includes additional lines and details, which are not described here because they are no part of the present invention.

The vehicle also has a second brake system, i.e. the parking brake system. This system receives compressed air from the tanks 4 and 5 through a feed line 11. From the line 11 the compressed air is passed to a control valve 12, from which compressed air is fed through the line 13 to the rear wheels 2. The parking brake system operates as follows. When the line 13 is pressureless, the brake blocks are applied by springs in the wheels 2. For releasing the parking brake, the valve 12 is adjusted so that compressed air is passed through the line 13 and thereby the brake blocks are released from the brake drums in the rear wheels 2 against the action of the springs (not shown). The parking brake, thus, is actuated as soon as the valve 12 is adjusted or the pressure in the compressed air system ceases. The parking brake system, like the aforementioned decelerating brake system, also includes details and lines, which are not described here as not being part of the present invention.

The locking device comprises a three-way valve 14 inserted in the line 11 and operated by a code lock 15. The code lock can be mechanical or electronic and determines the position for the valve body in the three-way valve 14. The three-way valve has an outlet opening 16 communicating with the valve 12, and a second outlet opening 17 communicating with the brake circuit for the front wheel brakes via the line 18. A check valve 19 in the line 18 ensures that compressed air can be passed to the brake system of the front wheels 1, but that the line is blocked in the opposite direction. This function is carried out by the valve body 20. In the line 9 extending from the decelerating brake valve 6 to the brake system of the front wheels a second check valve 21 is provided, which comprises a valve body 22 acting in such a manner, that pressure can be fed from the line 9 to the brakes of the front wheels, but not in the opposite direction.

A valve body 23 schematically shown in the three-way valve 14 can assume two positions. In the first position the line 11 is connected to the outlet port 16. In this position the line 17 communicates with a bleeding opening 24. In the second position the line 11 communicates with the outlet opening 17, but the outlet opening 16 and the exhasut opening 26 are closed. It also is to be observed that the decelerating brake valve 6 normally is of such a design, that, when the line 9 is not supplied with pressure from the valve 6, this line is vented via a bleed opening in the valve 6, in order to ensure that the brakes are released entirely when no braking action is to be applied on the front wheels or rear wheels.

The three-way valve, as mentioned above, is operated by the code lock 15. When the code lock 15 is set in locked position, the valve body 23 is adjusted in such a manner, that compressed air with full or reduced pressure is passed from the line 11 through the valve 14 out through the opening 17 to the line 18. The compressed air passes through the check valve 19 and actuates the brakes in the front wheels 1. The pressure cannot be relieved via the line 9 owing to the check valve 21 and, thus, full pressure is fed from the line 18 to the front wheel brakes. At the same time the connection between the line 11 and control valve 12 is cut off, because the outlet port 16 in the three-way valve 14 is closed by the valve body 23. Consequently, no matter how one tries to manipulate with the valve 12, the line 14 cannot be pressurized so that the parking brake acting on the rear wheels 2 can be released. The vehicle, thus, cannot be moved rolling, because all four wheels are braked and the brakes cannot be released unless first the lock 15 is unlocked. The lock can be a code lock according to a certain system, and the person to release the brakes impresses the correct code whereby the three-way valve 14 is adjusted to operation function for the vehicle. The operation position is such, that the valve body 23 is adjusted so that the line 12 and outlet port 16 are connected to each other. Hereby the line 13 can be pressurized, and the parking brake in the rear wheels 2 be released. Simultaneously the outlet port 17 is connected to the exhaust opening 24, whereby the line 18 is vented, and the check valve 19 can become active when pressure is supplied through the line 9 for braking the front wheels 1 when the vehicle is running. The valve body 20 of the check valve closes the connection between the line 9 and 18, and the compressed air in the line 9 is fed to the front wheels. It would not be possible to move or adjust the valve body 20 in the check valve 19, if there were not the venting possibility at the three-way valve 14.

In FIG. 2 a variant of the two check valves 19 and 21 is shown, which variant implies that the check valves have been assembled to a double check valve with one valve body 25, which alternatively can cut off rearward to the line 18 or line 9.

The device according to the invention is described in the following applied to a trailer, with reference to the FIGS. 3, 4 and 5. Trailers are equipped with a compressed-air brake system, which is operated with compressed air from the traction vehicle via a control line 26 between the vehicles. In a parallel feed line 27 compressed air is transferred with full pressure from the pressure tanks of the traction vehicle to the pressure tank 28 of the trailer. A relay valve 29 is controlled by pressure impulses of the control line so as to permit an adjusted air pressure to pass directly from the feed line 27 and, respectively, compressed-air tank 28 to the brakes both on the front wheels 30 and rear wheels 31. If the feed line 27 would be torn off or when it is not connected, the relay valve 29 permits full braking pressure to pass to the brakes from the tank 28, so that the brakes are locked.

In the same way as at the traction vehicle, parking brakes of the spring brake type are provided which are located at least on either front or rear wheels. The brakes are released in the same way as at the traction vehicle by compressed air, which releases the brakes when the compressed air is permitted to pass to the brakes.

According to the invention idea, in the same way as at the traction vehicle a three-way valve 32 is provided which branches the compressed air from the tank 28 and line 33 to either the line 34, which extends to the front brakes, and the line 35, which extends to the parking brakes on the rear wheels. From the relay valve 29 a line 36 extends in conventional manner, which line normally provides for the decelerating brake for the front wheels 30 to function. In the meeting point of the lines 36 and 34 a double check valve 37 is inserted which corresponds to the check valve according to FIG. 2. Instead of said double check valve, a single check valve can be located in each of the lines 34 and 36. FIG. 3 shows the system in normal driving position where, thus, the hoses 26 and 27 are connected to the traction vehicle, and the code lock 15 is disengaged. The three-way valve 32 then keeps the connection between line 33 and 35 open, which implies that via a control valve (not shown) the parking brakes on the rear wheels can be maintained pressurized so that the brakes do not apply. The decelerating brake operates in normal manner, in that the relay valve 29 feeds pressure, when demanded, to the line 36 and via the check valve 37 all the way to the brakes of the front wheels 30.

FIG. 4 shows the anti-theft device engaged in locked position, in that the code lock 15 is set for locking. This presupposes the hoses 26 and 27 to be connected to the traction vehicle. The trailer will now be braked partly in that compressed air is passed via the line 33 to the line 34 because the three-way valve 32 is so adjusted, and partly in that the parking brake acting on the rear wheels 31 cannot be released as the line 35 has no pressure. In said position for the three-way valve 32, also the line 35 is vented via a bleed port (not shown).

FIG. 5 shows a third case, at which the feed line 27 and control line 26 are presupposed to be disengaged from the traction vehicle. When the anti-theft device, i.e. the three-way valve 32, is not set in locked position by the code lock 15, the decelerating brakes are applied via the relay valve 29 by the compressed air in the pressure tank 28. The arrows 38 and 39 indicate the flow positions for the compressed air to the rear and, respectively, front wheels.

When the pressure tank 28 fails to have compressed air, the parking brake in the rear wheels automatically is put into operation when there is no pressure to keep the brake blocks free from the brake drums.

When the anti-theft device is operative, i.e. the three-way valve 32 is set in the position shown in FIG. 4, the parking brake acting on the rear wheels 31 is applied, because the line 35, as mentioned before, is vented. When there is compressed air in the pressure tank 28, the decelerating brakes are applied in the same way as described with reference to FIG. 4.

Several embodiments can be imagined within the scope of the invention idea. Especially the design of the check valves or double check valve can be varied within the known state of art concerning check valves. The passing also can be varied within the scope of what has been described in respect of the function of the valves. The design of the three-way valve also can be varied.

The code lock controlling the valve body in the three-way valve preferably can be electronic, but also a mechanically operating code lock is imaginable. It is also to be understood that, even when the three-way valve and the check valves in combination have been inserted so as to actuate the decelerating brakes of the front wheels, said units as well can be arranged so that the decelerating brakes of the rear wheels are actuated. It is further to be pointed out, that the invention has been described above at a specific form of hydraulic system, where the working medium is compressed air. The invention can as well be applied to braking systems where the working medium is a fluid, for example hydraulic oil. In that case the compressed-air tank 4 and, respectively, 28 is replaced by a hydraulic pressure source, for example a pump which pumps the hydraulic fluid from the tank 4 and, respectively, 28 and pressurizes the same. The relief via the line 24 by means of the three-way valve 14 and, respectively, 32 of the line 18, 34 then takes place by the passage of the pressure fluid to the tank via the dashed line 40, see FIG. 1. The tank 4 and, respectively, 28 in that case is pressureless, i.e. open to the surrounding.

I claim:

1. A device for preventing the theft of vehicles and trailers, the deceleration brakes and parking brake of which are brakes operated with pressure medium, and which include at least two wheel pairs, a decelerating brake circuit, and a foot-operated decelerating brake valve, comprising a valve controlled by a code lock; said valve being a three-way valve having one inlet port and two outlet ports; said valve being disposed in a feed line between a pressure medium source for actuating the parking brake and a control valve for the parking brake; said inlet port of said outlet ports being connected to said control valve, and the second one of said outlet ports being connected to the decelerating brake circuit for either one of the wheel pairs via a first check valve; a feed line from the foot-operated deceleration brake valve comprising a second check valve; by the locked position of a code lock, maintained in a first position, wherein the connection between said inlet port and said one of said outlet ports, is closed while maintaining the connection between said inlet port and said second one of said outlet ports open; and vice versa in a second, open position of said code lock, the line between said three-way valve and said first check valve being relieved of pressure when said code lock assumes said open position: said three-way valve including a pressure relief opening which is maintained in connection to said second outlet port of said valve body of said three-way valve when said valve body closes the connection with said inlet port and said second outlet port.

2. A device as claimed in claim 1, wherein the deceleration brake circuit includes the brake circuit for the front wheels.

3. A device as claimed in claim 1, wherein said first check valve and a second check valve are assembled to one valve unit to form one said valve body which closes the return flow alternatively in either of two inlet ports to said valve.

4. A device as claimed in claim 1 where the pressure medium is compressed air and wherein said pressure relief opening opens to the surrounding.

5. A device as claimed in claim 1 where the pressure medium is hydraulic liquid, and wherein said pressure relief opening is connected by a return line to a pressureless tank for the hydraulic liquid.

* * * * *